United States Patent [19]

Metzger

[11] 4,336,279
[45] Jun. 22, 1982

[54] APPARATUS AND PROCESS FOR DRYING AND CURING COATED SUBSTRATES

[76] Inventor: Wesley A. Metzger, 3107 Knoll Dr., Falls Church, Va. 22402

[21] Appl. No.: 924,814

[22] Filed: Jul. 4, 1978

[51] Int. Cl.³ .............................................. B05D 3/06
[52] U.S. Cl. ......................................... 427/55; 34/4; 34/18; 34/41; 34/68; 34/160; 34/162; 118/67; 118/68; 118/642; 118/643; 427/378; 427/379; 427/381; 427/382
[58] Field of Search .................. 427/55, 372 R, 378, 427/381, 379, 382, 372.2; 118/66, 67, 68, 641, 642, 643; 34/4, 18, 68, 41, 155, 160, 162; 432/144, 147

[56] References Cited

U.S. PATENT DOCUMENTS

| | | | |
|---|---|---|---|
| 2,405,813 | 8/1946 | Blanchard | 34/68 |
| 2,795,054 | 6/1957 | Bowen | 118/68 |
| 2,889,806 | 6/1959 | Conant | 118/643 |
| 2,920,399 | 1/1960 | Fry | 34/160 |
| 3,183,605 | 5/1965 | Argue et al. | 118/68 |
| 3,214,274 | 10/1965 | Ohyama et al. | 427/378 |
| 3,383,239 | 5/1968 | Christman | 427/378 |
| 3,398,016 | 8/1968 | Goldman et al. | 427/378 |
| 3,403,456 | 10/1968 | Smith | 34/4 |
| 3,720,002 | 3/1973 | Martin | 34/18 |

FOREIGN PATENT DOCUMENTS

| | | | |
|---|---|---|---|
| 38-19643 | 9/1963 | Japan | 118/642 |
| 1310425 | 3/1973 | United Kingdom | 427/55 |

Primary Examiner—Ronald H. Smith
Assistant Examiner—S. L. Childs
Attorney, Agent, or Firm—Schwartz & Weinrieb

[57] ABSTRACT

Apparatus for practicing the process of the present invention includes a flashing section which emits high-velocity, hot air onto the substrate, and a drying and curing section disposed downstream of the flashing section which emits high-velocity, hot air and radiant energy onto the substrate. The flashing and drying/curing sections are fluidically connected to an exhaust duct disposed upstream of the flashing section whereby the spent hot air, and entrained volatiles, are exhausted and recirculated for subsequent flashing and drying/curing process steps. The flashing section comprises air knives having their exhaust directions inclined in the upstream direction toward the exhaust duct, and fresh ambient air may also enter the exhaust stream from a downstream position so as to alter the percentage of volatiles within the recirculated air stream.

12 Claims, 1 Drawing Figure

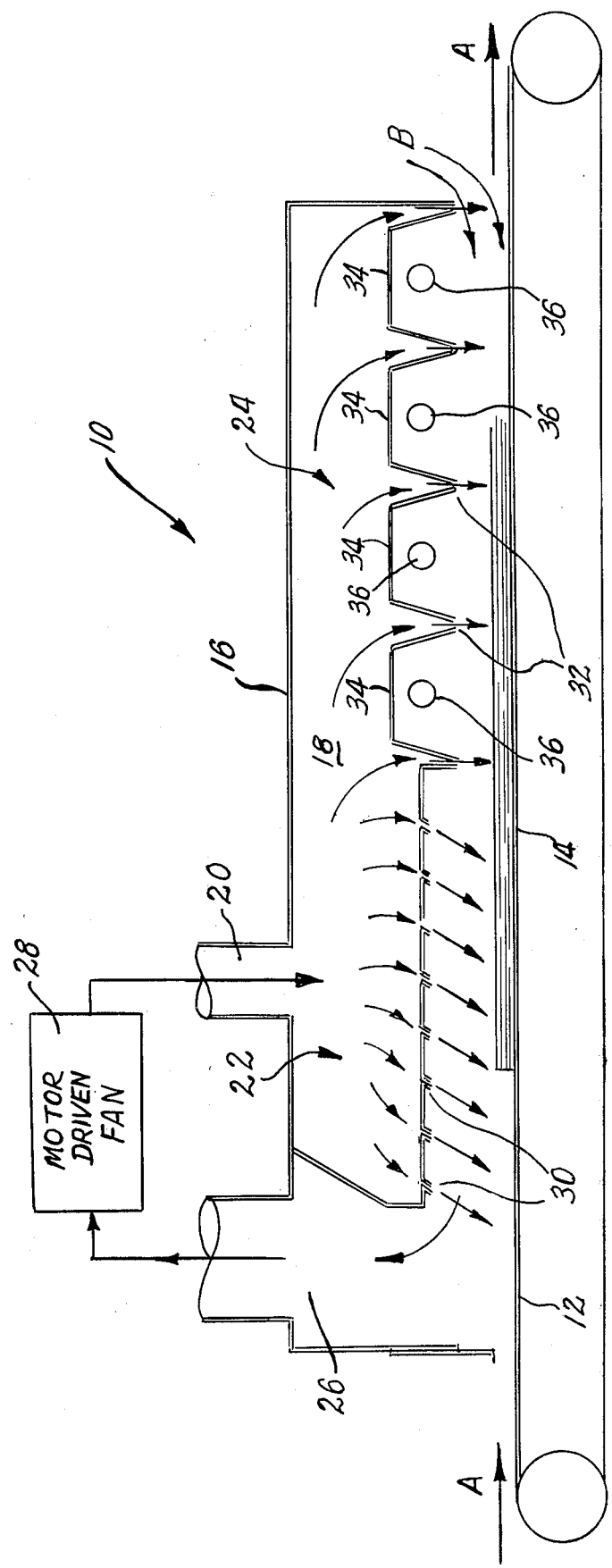

APPARATUS AND PROCESS FOR DRYING AND CURING COATED SUBSTRATES

FIELD OF THE INVENTION

The present invention relates generally to drying and curing processes and apparatus, and more particularly to processes and apparatus for drying and curing coatings on substrates.

BACKGROUND OF THE INVENTION

While the use of fluid supply and radiant heating apparatus within drying and curing systems are quite well-known, conventional systems employing such apparatus have significant disadvantages, the primary disadvantage being inefficiency. This operational defect, in turn, renders such conventional systems impractical, economically unfeasible, and commercially unacceptable. In addition, the quality of the work products is also often deleteriously affected.

The inefficiency of such conventional systems probably manifests itself best in the form of poorly defined fluid flow paths within the various systems. For example, the absence of effective exhaust facilities within the systems leads to the development of stagnant boundary layer conditions within the vicinity of the substrate. Such conditions substantially impede the evolution of the volatile constituents from the substrate. In addition, such conditions materially interfere with the transfer of energy from the radiant energy sources to the substrate. As a result, the drying process proceeds at an unacceptably low rate whereby the drying process time must be increased. In view of the fact that the substrates are normally transported along suitable conveying means throughout the system during the drying process, additional system layout area is required.

Similarly, the prior art systems do not provide for the flashing off of a substantial portion of the volatile constituents comprising, for example, water or solvent base coatings. As a result, an appreciable portion of such constituents may be absorbed within the substrate and subsequently trapped therein in view of subsequent drying or curing process steps. Substantial absorption of these constituents into the substrate causes imperfections therein, such as, for example, streaking, distortion, deformation, and the like.

Still further, in conjunction with the aforenoted exhaust facilities and flashing apparatus, proper facilities are also required in order to recirculate the treating fluid within the system. This is likewise of paramount importance from an efficiency and energy conservation viewpoint in view of the fact that the spent treating fluid has a substantial amount of heat embodied therein. The heat level of such air is to be properly maintained in view of the drying processes to be achieved, however, fresh ambient air must also be supplied into the system in order to provide sufficient cooling for the radiant energy source reflectors as well as to modify the volatile constituent level within the recirculated fluid. In conjunction with such fluid control characteristics, controlled exhaust means must likewise be provided in order to exhaust a predetermined percentage of the recirculated air.

OBJECTS OF THE INVENTION

Accordingly, it is an object of the present invention to provide a new and improved process, and apparatus for practicing the same, for drying and curing coatings on substrates.

Another object of the present invention is to provide a new and improved process, and apparatus for practicing the same, for drying and curing coatings on substrates which overcome the various disadvantages of prior art processes and apparatus.

Still another object of the present invention is to provide a new and improved process, and apparatus for practicing the same, for drying and curing coatings on substrates which will substantially improve the efficiency presently characteristic of conventional drying and curing processes and apparatus.

Yet another object of the present invention is to provide a new and improved process, and apparatus for practicing the same, for drying and curing coatings on substrates wherein the drying rates are materially increased with respect to conventional drying rates.

Still yet another object of the present invention is to provide a new and improved process, and apparatus for practicing the same, for drying and curing coatings on substrates which materially improves the fluid flow paths within the system so as to optimize the drying process parameters and thereby produce products of high and uniform quality.

A further object of the present invention is to provide a new and improved process, and apparatus for practicing the same, for drying and curing coatings on substrates wherein the fluid flow paths within the system are materially improved and the required system layout area correspondingly minimized.

A still further object of the present invention is to provide a new and improved process, and apparatus for practicing the same, for drying and curing coatings on substrates wherein the development of stagnant boundary layer conditions within the system is prevented so as to maximize the evolution of the volatile constituents from the substrate and materially improve the drying process.

A yet further object of the present invention is to provide a new and improved process, and apparatus for practicing the same, for drying and curing coatings on substrates wherein the development of stagnant boundary layer conditions within the system is prevented so as to maximize the energy transfer between the radiant heating sources and the substrate so as to enhance the drying process and conserve energy consumption.

A still yet further object of the present invention is to provide a new and improved process, and apparatus for practicing the same, for drying and curing coatings on substrates wherein the treating fluid is recirculated so as to optimally retain its inherent heat and thereby conserve energy consumption.

An additional object of the present invention is to provide a new and improved process, and apparatus for practicing the same, for drying and curing coatings on substrates wherein the fluid flow paths within the system include means for controlling the venting of a predetermined proportion of the treating fluid, and the supply of fresh ambient fluid, so as to properly control the content of the evolved volatiles within the treating fluid.

Still an additional object of the present invention is to provide a new and improved apparatus for practicing the process of the present invention which is transportable and adaptable for use in conjunction with the substrate conveyor system when required.

SUMMARY OF THE INVENTION

The foregoing and other objectives are achieved in accordance with the present invention through the provision of apparatus for practicing the process of the present invention which comprises an endless type conveyor system for transporting the substrate to be treated, and the drying apparatus which is disposed over the upper pass of the conveyor so as to dry and cure the upper surface of the substrate or panel. The drying apparatus includes a housing having a manifold or plenum chamber defined therein which supplies high velocity, hot air to an upstream flashing section, and a downstream drying and curing section, the upstream and downstream designations corresponding to the flow path of the substrate. An exhaust, recirculation duct is provided upstream of the flashing section, and a motor-driven fan is disposed within the duct so as to exhaust the treating fluid from the flashing and drying-/curing sections and to recirculate the fluid back to the supply manifold or plenum.

Air jets or air knives are formed within both the flashing and the drying/curing sections of the apparatus, and radiant energy heaters are also employed within the drying and curing section of the apparatus in conjunction with the air knives. Reflectors are disposed about the radiant energy sources, which may be of the rod type, and the air knives are defined between successive reflector units. The air knives within the flashing section are characterized by an exhaust angle inclined somewhat in the upstream direction toward the exhaust/recirculation duct in order to provide a velocity component along the substrate which will tend to sweep treating fluid previously directed against the substrate, along with its entrained evolved volatiles, into the exhaust duct. The exhaust duct is also provided with a damper which may be controlled so as to exhaust a predetermined proportion of the treating fluid to the atmosphere while recirculating the residual percentage thereof. In addition, the housing is disposed above the substrate and its conveyor so as to permit fresh ambient air to enter the treating fluid flowstream. In this manner, the percentage of the volatiles within the treating fluid may be optimally controlled.

BRIEF DESCRIPTION OF THE DRAWINGS

Various other objects, features, and attendant advantages of the present invention will be more fully appreciated as the same becomes better understood from the following detailed description when considered in conjunction with the accompanying drawing wherein:

The SOLE FIGURE is a schematic view of the drying and curing apparatus of the present invention, showing its cooperative parts for practicing the process of the present invention.

DETAILED DESCRIPTION OF THE ILLUSTRATED EMBODIMENT

Referring now to the drawing, the drying and curing apparatus of the present invention is shown and is generally indicated by the reference character 10. The apparatus is adapted to be utilized in conjunction with an endless type conveyor 12 upon which is transported the substrate 14 to be processed. The substrate 14 may be any one of a variety of different materials, such as, for example, sheet material, web material, particleboard, fiberboard, hardboard, softboard, plywood, wood flooring sheeting and material, metal sheeting, or the like, and the same may be coated, as required for a predetermined use, by means of a fill coat, base coat, printing ink, top coat, seal coat, or the like.

The apparatus 10 is supported upon a transportable framework, not shown, such as, for example, a carriage, and it is seen that the apparatus 10 includes a housing 16 which is disposed above the conveyor 12 and substrate 14 at a predetermined height level so as to achieve the desired infra-red radiant energy and heated air impingement characteristics with respect to the substrate 14. The height level is of course adjustable so as to accommodate differently elevated conveyors, and in a similar manner, the width of the apparatus housing 16, along with its infra-red radiant energy sources and heated-air knives, may likewise be varied so as to accommodate conveyors of varying widths.

The upper portion of the housing 16 has a manifold or plenum chamber 18 defined therein, and this chamber is adapted to be supplied with hot treating fluid, such as, for example, air, by means of an upstanding supply duct 20 integrally formed within the upper surface of the housing. The housing is also seen to comprise an upstream flashing section, generally indicated by the reference character 22, and a downstream drying and curing section, generally indicated by the reference character 24, the downstream and upstream designations being appreciated in conjunction with the flow path of the substrate 14 which as shown in the FIGURE travels from left to right, as denoted by arrows A, along the upper pass of the conveyor. An exhaust duct 26 is also defined within housing 16 upstream of the flashing section 22, and the exhaust duct is adapted to be fluidically connected to the supply duct 20 so as to provide for the recirculation of the treating fluid within the apparatus. A motor-driven fan, schematically shown at 28, is disposed within the ductwork interconnecting exhaust duct 26 and supply duct 20 in order to provide for such recirculation of the high-velocity air.

The flashing section 22 is seen to comprise a multitude of air jets or air knives 30 formed within the lower horizontal wall of housing 16 defining the manifold 18, and it is seen that the air knives 30 are so formed that the direction of each exhaust jet is inclined downwardly and somewhat in the upstream direction. This directionalized exhaust defines a flow velocity component in a direction counter to that of the flow of the substrate 14. The importance of this is twofold, the first important effect being an increased scouring effect of the treating fluid with respect to the substrate and the volatiles evolved therefrom, and second, such flow patterns effectively enhance the discharge of the treating fluid, and its entrained volatile constituents, toward and into exhaust duct 26.

The drying and curing section 24 of the apparatus is also seen to comprise a multitude of air jet or air knives 32 formed within the lower wall of housing 16, however, it is noted that the lower wall of the housing, within the drying and curing section 24, is not disposed substantially horizontally as within the flashing section 22, but to the contrary, the wall integrally defines serially arranged trapezoidal sections 34. The lower ends of the skirt-type sidewalls of the adjacent sections 34 are seen to define the air knives 32, and the housing sections 34 also have disposed therein rod-type infra-red radiant energy sources 36. The housing sections 34 thus serve as reflector elements for the energy sources 36 so as to direct the heat energy evenly and directly over a relatively large area of the conveyor upon which the substrate 14 is transported. While the reflector units 34 are illustrated as being trapezoidal in configuration, other configurations are of course possible, such as, for example, hemicylindrical or the like.

The entire length of the apparatus of the present invention is approximately eight and one-half (8.5) feet or one hundred two (102″) inches, and the compactness of the apparatus renders the same commercially desirable due to the relatively small layout area required to house the same. In addition, it is anticipated that the conveyor speed of the apparatus will be approximately fifty feet per minute (50 fpm), and accordingly, the length of the flashing and drying/curing sections of the apparatus must be sufficient in order to properly complete the designated steps of the process. The lineal extent of the flashing section of the apparatus, including the exhaust duct section 26, is in excess of three feet (3′) or approximately thirty-eight inches (38″), and consequently, the substrate to be dried is disposed within the flashing section 22 for a period approximating 3.8 seconds.

In order to adequately flash the substrate so as to flash off most, for example, 50–70%, of the volatiles from the water or solvent based coatings, and thereby prevent any appreciable absorption of the same into the substrate, it has been experienced that goods results are obtained by the present apparatus when the air issuing from jets 30 has a temperature value within the vicinity of 175° C., and a velocity value within the range of 6,000–8,000 feet/minute. Temperature values much in excess of the aforenoted figure will tend to blister the substrate. Similar parameters are of course likewise characteristic of the treating fluid air within the drying and curing section 24 of the apparatus as the treating fluid utilized within both sections 22 and 24 issues from the common source of supply, duct 20. It is further noted that an important characteristic of the rapid air flow within manifold 18 is that the treating fluid air serves to cool the reflector housing sections 34 as such air proceeds toward the knives 32. This cooling of the reflector units 34 is critical to the performance of the apparatus due to the fact that in the absence of such cooling, the reflector units would tend to overheat and become darkened in color thereby adversely affecting their reflectivity characteristics.

The aforenoted high-velocity air flow as dictated by the fan 28 also serves to rapidly exhaust the treating fluid, and entrained volatile constituents, from the flashing and drying and curing sections, and this mode of operation is likewise critical for several reasons. Firstly, such fluidic movement tends to enhance the evolution of the volatile constituents from the substrate, as well as the scouring away of the same. This, in turn, prevents the formation of a stagnant boundary layer within the vicinity of the substrate, and additionally enhances evaporative cooling of the substrate so as to prevent overheating of the same. The stagnant boundary layer conditions also materially interfere with the energy transfer from the radiant energy sources 36 to the substrate. Drying time is thus conventionally adversely affected, and considerable amounts of energy are expended and wasted. With the present invention, these disadvantages characteristic of prior art systems are eliminated. Secondly, the rapid flow streams within the system also serve to entrain fresh ambient air into the treating fluid. This important in order to properly control the percentage of the volatile constituents within the treating fluid as the same is recirculated throughout the system. Such percentages must be controlled in light of the particular substrate being processed. In conjunction with such percentage controls, the housing of fan 28 may be provided with a damper, not shown, whereby a predetermined amount of the treating fluid may be exhausted so as to provide additional percentage controls in conjunction with the fresh ambient air supplied to the system, as shown by the arrows B, at the downstream end of the apparatus through means of the space defined between the apparatus and the upper pass of conveyor 12.

In order to further enhance the operating characteristics of the present invention, it is also noted that it is desired to achieve a higher radiant heat/heated air ratio at the downstream end of the apparatus than at the upstream end of the apparatus. The reason for this is that when the web enters the drying apparatus with a wet coating on its upper surface, the high-velocity, hot air is particularly effective for achieving the flashing process steps, and the proportion of radiant heat energy required is low. As the web progresses through the apparatus, however, increased evaporation solely by means of the forced hot air is difficult to obtain. Drying by means of radiant heating, however, has proven particularly effective, and consequently, an increased proportion of radiant heat within the downstream region is required.

While the radiant heating sources 36 have been illustrated as being of the rod-element type, other sources of radiant energy are of course available. In addition, while the radiant sources may be electrically fired units, other types of heaters may be employed, such as, for example, gas fired units. In either case, it is also imperative that the heat sources be adjustable with respect to the emitted energy wavelengths due to the fact that particular coatings may be affected by particular wavelengths of the radiation while not affected by other wavelengths of the radiation. The radiant energy sources may thus be provided with suitable controls for adjusting the temperature thereof which effectively alters the wavelengths of the emitted radiation. For example, it is desirable to attune the wavelength of the radiation to a value which is absorbed by water and not by the coating per se. In this manner, the moisture is evaporated while maintaining the coating intact. It has been found that good results are obtained when the wavelengths of the radiation are within the range of 2–7 microns.

Obviously, many variations and modifications are possible in light of the above teachings. It is therefore understood that within the scope of the appended claims, the present invention may be practiced otherwise than as specifically described herein.

What is new and desired to be secured by Letters Patent of the United States is:

1. Apparatus for drying and curing coatings on substrates conveyed through said apparatus, comprising:
    means for supplying high-velocity, hot air;
    means fluidically connected to said air supply means for conducting said high-velocity, hot air onto said substrate so as to achieve flashing of volatile constituents from said substrate coating;
    means fluidically connected to said air supply means and located downstream of said flashing means for conducting said high-velocity, hot air onto said substrate subsequent to said flashing operation so as to further dry and cure said substrate, and further including radiant heating means for further drying and curing said substrate in conjunction with said downstream fluidic means;

means, disposed upstream of said upstream fluidic means, for exhausting said air from the vicinity of said substrate and recirculating said air to said hot air supply means;

said downstream fluidic means comprising a plurality of air knives having their exhausts directed normal to the flow path of said conveyed substrate; and said radiant heating means comprising heating elements and means defining reflector units about said radiant heating elements, said reflector means also defining said air knives.

2. Apparatus as set forth in claim 1, wherein said upstream fluidic means comprises:

a plurality of air knives having their exhausts aligned in an inclined direction with respect to said substrate such that a velocity component of said exhausts is directed upstream and counter to the flow direction of said conveyed substrate.

3. Apparatus as set forth in claim 1, wherein said downstream fluidic means comprises:

a plurality of air knives having their exhausts directed normal to the flow path of said conveyed substrate.

4. Apparatus as set forth in claim 1, wherein said radiant heating means comprises:

rod-type infra-red heating elements.

5. Apparatus as set forth in claim 1, wherein:

said downstream fluidic means comprises a plurality of air knives having their exhausts directed normal to the flow path of said conveyed substrate; and said radiant heating means comprises rod-type infra-red heating elements interposed between successive ones of said air knives.

6. Apparatus as set forth in claim 5, further comprising:

means defining reflector units about said radiant heating elements.

7. Apparatus as set forth in claim 6, wherein:

said means defining said reflector units also serve to define said air knives.

8. Apparatus as set forth in claim 6, wherein:

said reflector units are disposed within an air manifold fluidically interconnecting said supply means and said air knives whereby said air within said manifold cools said reflector units so as to prevent overheating thereof.

9. Apparatus as set forth in claim 1, further comprising:

means for permitting fresh ambient air to enter said apparatus and mix with said exhausted air so as to alter the percentage of volatiles within said recirculated air.

10. A process for drying and curing coatings on substrates, comprising the steps of:

conveying the substrate along a defined path;

conducting high-velocity, hot air onto the full surface of the coating on said substrate so as to achieve flashing of volatile constituents from said substrate coating;

conducting high-velocity, hot air, along with radiant heat energy, onto said substrate at a position downstream from said flashing so as to achieve further drying and curing of said substrate; and exhausting said hot air, at a position upstream of said flashing, so as to recirculate said hot air for said flashing and further drying and curing.

11. A process as set forth in claim 10, further comprising:

conducting said flashing hot air onto said substrate at an angle inclined with respect to said defined path of said substrate and in the upstream direction counter to the flow direction of said substrate so as to sweep said volatiles away from said substrate and toward said upstream exhaust position.

12. A process as set forth in claim 10, further comprising:

conducting fresh, ambient air into said exhausted hot air stream so as to alter the percentage of volatiles within said recirculated air.

* * * * *